March 28, 1950 J. D. BYRD 2,502,309
WHEEL MOUNT
Filed Dec. 29, 1947
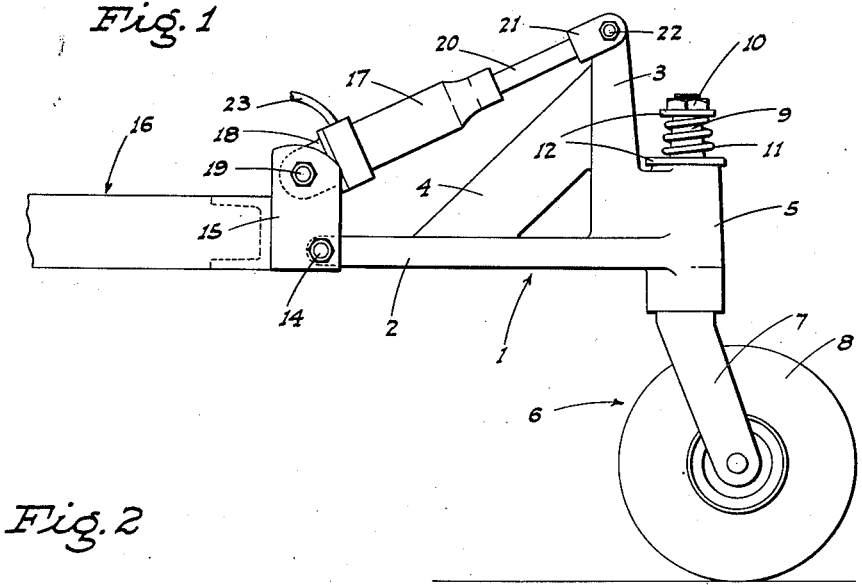
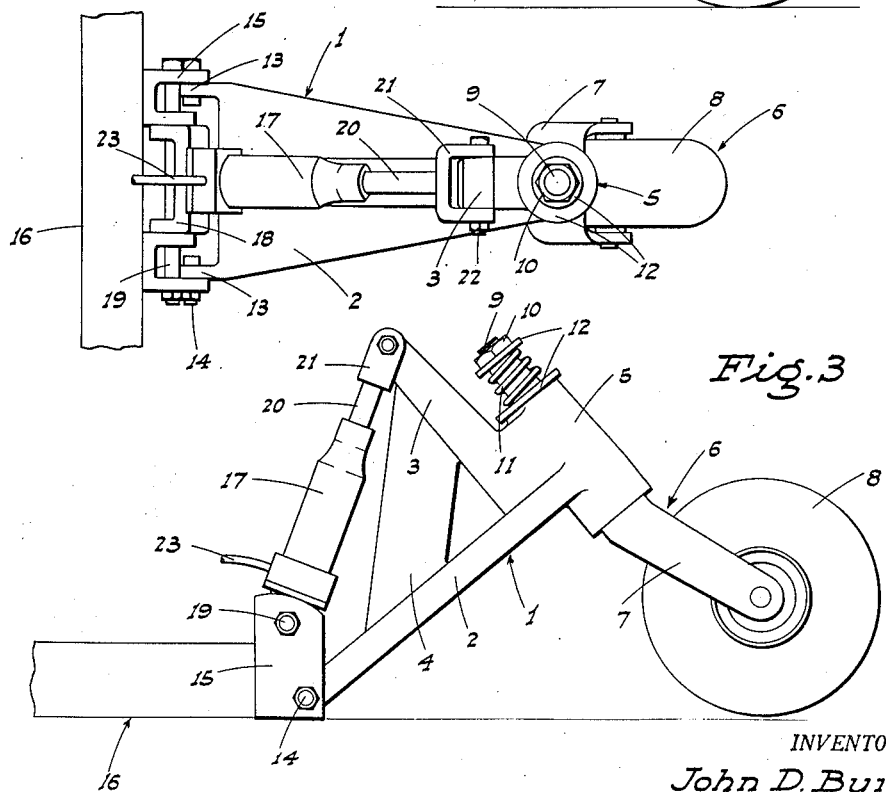
INVENTOR.
John D. Byrd
BY
Webster & Webster
ATTYS Patented Mar. 28, 1950

2,502,309

UNITED STATES PATENT OFFICE 2,502,309

WHEEL MOUNT

John D. Byrd, Fresno, Calif., assignor of one-half to Eino K. Hemmila

Application December 29, 1947, Serial No. 794,353

4 Claims. (Cl. 280—44)

This invention is directed to, and it is an object to provide, a novel wheel mount for vehicles.

Another object of the invention is to provide a wheel mount which, while having many possible uses, is especially designed for vehicle trailers.

A further object of the invention is to provide a wheel mount, as above, which is vertically adjustable between a relatively lowered position with the trailer bed raised for transport, and a relatively raised position with the bed lowered to the ground, or adjacent the same, for loading or unloading.

An additional object of the invention is to provide a wheel mount, as in the preceding paragraph, in which said mount includes a fluid pressure actuated power cylinder; said cylinder being operative to accomplish the aforesaid relative vertical adjustment of the mount.

It is also an object to provide a wheel mount which is simple but rugged in construction, and reliable when in use.

A further object of the invention is to provide a practical and convenient wheel mount, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the wheel mount as in use and in its relatively lowered position.

Fig. 2 is a plan view of the wheel mount.

Fig. 3 is a side elevation of the wheel mount, but in its relatively raised position with the trailer bed lowered into ground engagement.

Referring now more particularly to the characters of reference on the drawings, the mount comprises a rigid bellcrank, indicated generally at 1, which bellcrank has a lower leg 2 and an upstanding leg 3. The lower leg 2 tapers from its outer towards its inner end, as shown, in order to provide ample strength, and a diagonal brace 4 connects between said legs for further rigidity.

At the juncture of the legs 2 and 3, the bellcrank 1 is formed with an integral boss 5 having a bore in an up and down direction.

The boss 5 carries a caster wheel unit, indicated generally at 6, which unit includes a fork 7 fitted with a pneumatic-tired ground wheel 8. A spindle 9 upstands centrally from the fork 7 and is journaled in, and projects above, said boss. A nut 10 is threaded on the upper end of the spindle 9, and a loaded compression spring 11 surrounds the spindle above the boss 5 between the latter and said nut 10; there being protective washers 12 at opposite ends of said spring.

At the end opposite the boss the lower leg 2 of the bellcrank 1 is formed with transversely spaced, outwardly projecting ears 13 which are pivoted by bolts 14 to corresponding U-shaped brackets 15 rigidly attached, in spaced relation, to the bed 16 of the trailer at one end of the latter. As so attached to the bed 16, the bellcrank 1 projects therefrom lengthwise of the direction of travel.

At this point it should be noted that while for certain adaptations a single wheel mount might suffice, the wheel mount may be used in multiple on the trailer bed. For example, a pair of wheel mounts may be used at one or both ends of the bed 16 in transversely spaced relation.

On each wheel mount, a fluid pressure actuated power cylinder 17 extends above the lower leg 2 at an upward and outward incline; such power cylinder 17 being pivotally secured, at its inner end, by an attachment yoke 18 disposed between the bracket 15 and turnably mounted on a cross pin 19 supported by said brackets. Opposite ends of the attachment yoke 18 bear directly against adjacent and corresponding ends of the brackets 15 whereby to prevent side play.

At the opposite end the cylinder 17 includes an outwardly projecting connecting rod 20 having a clevis 21 on its free end pivotally secured by a bolt 22 to the upper end of the upstanding leg 3 of the bellcrank 1.

The cross pin 19, which forms the pivotal axis for the adjacent end of the cylinder 17, is vertically offset from the bolts 14, whereby to improve the leverage of the cylinder.

The cylinder 17 is interposed in a fluid pressure control system, indicated in part at 23, which is valve-regulated by the operator of the draft vehicle. In this manner the cylinder 17 may be caused to extend or contract. When extended, the power cylinder 17 swings the described wheel mount to a relatively lowered position, whereupon the bed 16 is raised for transport. Conversely, retraction of the power cylinder 17 relatively raises the wheel mount, lowering the bed 16 to selective extent, which may be into ground engagement, as shown in Fig. 3. Lowering of the bed 16 is desirable and advantageous for the reason that it facilitates loading or unloading of said bed.

When the described wheel mount is used in multiple in connection with a vehicle bed, the corresponding fluid pressure control systems 23 are connected together for simultaneous adjustment of said mounts.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A wheel mount for a vehicle body, such mount comprising a bracket adapted to be rigidly attached to the rear end of the body, a bell crank, the free end of one leg of the bell crank being pivoted to the bracket, the other leg of the bell crank projecting outwardly from the other end of the first leg at substantially right angles thereto, a wheel mounted on the outer end of the bell crank and extending at substantially right angles to the first leg and in a direction opposite to that in which the second named leg extends, and adjustment means interposed between the bracket and the free end of the second named leg and effective to swing the bell crank on the pivot between the first named leg and the bracket.

2. A wheel mount as in claim 1 in which the adjustment means comprises a hydraulic ram pivoted at one end to the bracket in spaced relation to the pivot between the first named leg and the bracket and pivoted at the other end to the free end of the second named leg.

3. A wheel mount as in claim 2 in which the pivot point between the ram and bracket is offset from the pivot point between the first named leg and bracket and in a direction away from the second named leg.

4. A wheel mount as in claim 3 in which the wheel mount on the bell crank includes a boss on the bell crank, such boss having a longitudinal bore, the wheel having a spindle journaled in the bore, spaced washers about the free end of the spindle outside the bore, and a loaded compression spring disposed about the spindle between the washers.

JOHN D. BYRD.

REFERENCES CITED

The following references are of record in the file of this patent:

UNITED STATES PATENTS

| Number | Name | Date |
| --- | --- | --- |
| 1,941,143 | Wickersham | Dec. 26, 1933 |
| 2,103,588 | Blew | Dec. 28, 1937 |
| 2,208,526 | Gurries | July 16, 1940 |
| 2,227,762 | Ronning | Jan. 7, 1941 |
| 2,270,390 | Summers | Jan. 20, 1942 |
| 2,348,445 | Bayer | May 9, 1944 |
| 2,360,902 | Simmons | Oct. 24, 1944 |

FOREIGN PATENTS

| Number | Country | Date |
| --- | --- | --- |
| 219,250 | Great Britain | Aug. 24, 1924 |